US009253392B2

(12) United States Patent
Hashimoto et al.

(10) Patent No.: US 9,253,392 B2
(45) Date of Patent: Feb. 2, 2016

(54) IMAGING APPARATUS AND CONTROL METHOD AND PROGRAM OF IMAGING APPARATUS

(71) Applicant: CANON KABUSHIKI KAISHA, Tokyo (JP)

(72) Inventors: Yoshitaka Hashimoto, Yokohama (JP); Yasufumi Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/458,440

(22) Filed: Aug. 13, 2014

(65) Prior Publication Data
US 2015/0054972 A1    Feb. 26, 2015

(30) Foreign Application Priority Data

Aug. 23, 2013    (JP) .................................. 2013-173763

(51) Int. Cl.
*H04N 5/232* (2006.01)
*G02B 7/34* (2006.01)
*G03B 35/12* (2006.01)

(52) U.S. Cl.
CPC .............. *H04N 5/23212* (2013.01); *G02B 7/34* (2013.01); *H04N 5/23229* (2013.01); *G03B 35/12* (2013.01)

(58) Field of Classification Search
CPC . H04N 5/23212; H04N 5/2351; G03B 13/34; G02B 7/02
See application file for complete search history.

(56) References Cited

U.S. PATENT DOCUMENTS

| 7,936,392 | B2 | 5/2011 | Ng et al. |
| 8,184,968 | B2 | 5/2012 | Ohnishi |
| 8,514,318 | B2 * | 8/2013 | Hiasa .................... H04N 5/2355 348/340 |
| 8,599,304 | B2 | 12/2013 | Hashimoto |
| 8,743,245 | B2 * | 6/2014 | Hiasa ................. H04N 13/0011 250/201.2 |

FOREIGN PATENT DOCUMENTS

| JP | 2010-213038 A | 9/2010 |
| JP | 4752031 B2 | 8/2011 |

OTHER PUBLICATIONS

Ren Ng, Fourier Slice Photography, 2005 ACM Trans. Graph. 24, 735-744.

* cited by examiner

*Primary Examiner* — Tuan Ho
(74) *Attorney, Agent, or Firm* — Fitzpatrick, Cella, Harper & Scinto

(57) ABSTRACT

An imaging apparatus having an image formation optical system having a lens for focus adjustment of an optical image of an object and an imaging unit for picking up the formed optical image and generating a pixel signal from which a refocus image can be generated includes: a calculation unit for obtaining information of the object the optical image of which is picked up by the imaging unit and calculating, based on the obtained object information, a range of a lens position at which the refocus image of the object being in-focus can be generated; a prediction unit for predicting, based on the lens position range, a change of the calculated lens position at which the refocus image of the object being in-focus can be generated; and a determination unit for determining a drive position of the lens based on a prediction result.

14 Claims, 15 Drawing Sheets

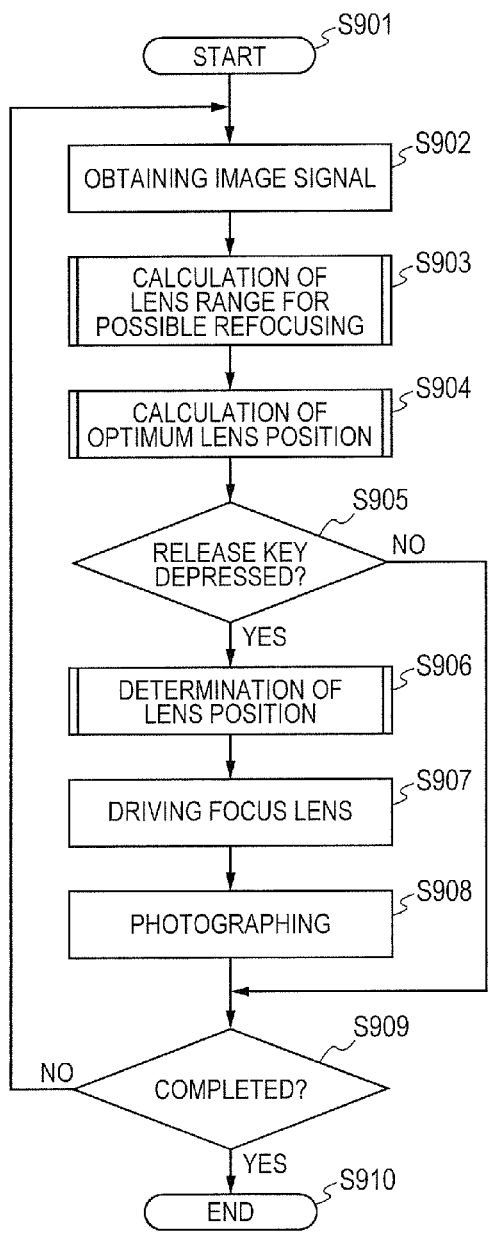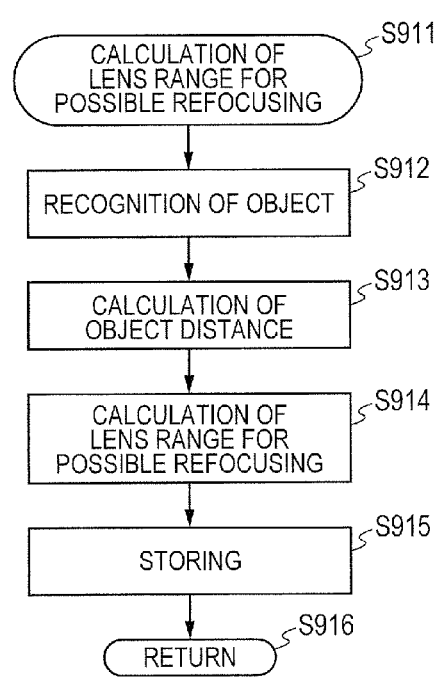

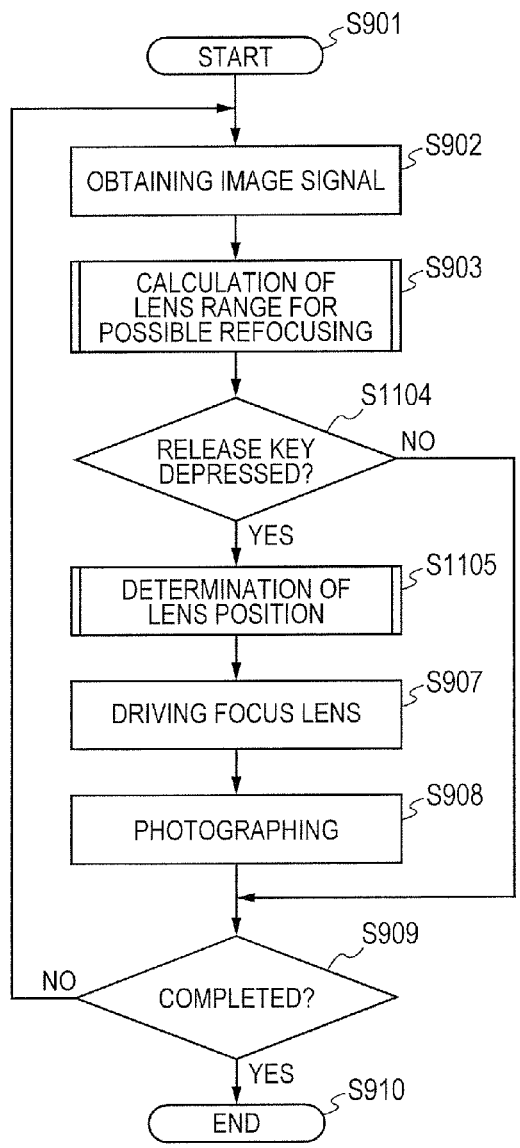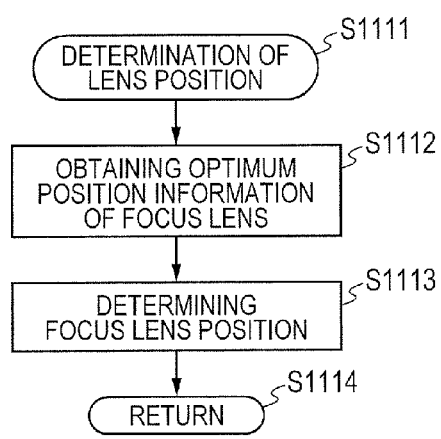
FIG. 11A
FIG. 11B

IMAGING APPARATUS AND CONTROL METHOD AND PROGRAM OF IMAGING APPARATUS

BACKGROUND OF THE INVENTION

1. Field of the Invention

The present invention relates to an imaging apparatus and, more particularly, to an imaging apparatus which can generate image data which can be refocused and a control method of such an imaging apparatus.

2. Description of the Related Art

In recent years, an imaging apparatus which outputs various kinds of images by executing an arithmetic operation to data obtained by an imaging element and executing a digital image processing corresponding to the arithmetic operation is proposed. Japanese Patent No. 4752031 discloses an imaging apparatus which simultaneously obtains two-dimensional intensity distribution of light of an object space and angular information of a ray of light, that is, parallax information by using "Light Field Photography". The two-dimensional intensity distribution of light and the angular information of the ray of light are together called "light field". By obtaining the light field, three-dimensional information of the object space can be obtained. Focus control of the image which is performed after the photographing and is called "refocus", control of a viewpoint change and a depth of field, and the like can be performed by a reconstruction processing of an image based on the light field.

Japanese Patent Application Laid-Open No. 2010-213038 discloses such an imaging apparatus that in the case where a plurality of objects of different distances exist, the number of objects from which in-focus images can be reconstructed on the basis of a signal obtained by the photographing of one time can be increased as much as possible.

However, the imaging apparatus disclosed in Japanese Patent No. 4752031 has such a problem that there is a case where a range in which an image can be refocused by the user differs from a user's desired range. The imaging apparatus disclosed in Japanese Patent Application Laid-Open No, 2010-213038 has such a problem that since defocus amounts are calculated with respect to a plurality of object area upon photographing and a release is performed, a release time lag occurs.

SUMMARY OF THE INVENTION

It is, therefore, an aspect of the invention to provide an imaging apparatus which can obtain image data which can be refocused to a user's desired object while reducing a release time lag.

To accomplish the aspect of the invention, an imaging apparatus having an image formation optical system having a lens for performing a focus adjustment of an optical image of an object and an imaging unit configured to pick up the optical image formed by the image formation optical system and generate a pixel signal from which a refocus image can be generated, comprises: a calculation unit configured to obtain information of the object the optical image of which is picked up by the imaging unit and calculate, on the basis of the obtained information of the object, a range of a position of the lens at which the refocus image of the object being in-focus can be generated; a prediction unit configured to predict, on the basis of the range of the lens position, a change of the calculated lens position, at which the refocus image of the object being in-focus can be generated; and a determination unit configured to determine a drive position of the lens on the basis of a result of the prediction.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 9A, 9B, 9C and 9D are diagrams illustrating flowcharts for the photographing operation of the imaging apparatus according to the first embodiment of the invention.

FIGS. 11A and 11B are diagrams illustrating a flowchart, for the photographing operation of an imaging apparatus according to the second embodiment of the invention.

DESCRIPTION OF THE EMBODIMENTS

Figure 1:
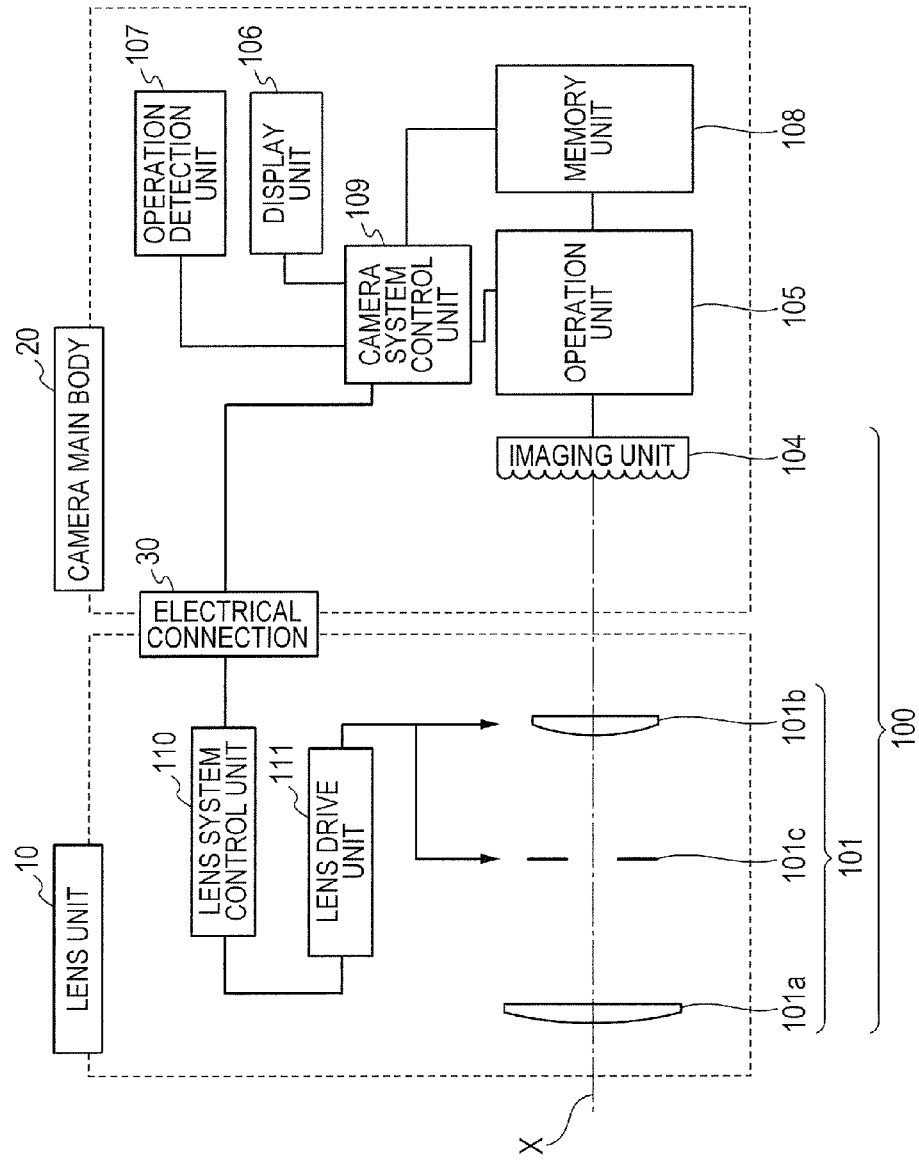
FIG. 1 is a diagram illustrating a construction of a main portion of an imaging apparatus according to the first embodiment of the invention.

Various exemplary embodiments, features, and aspects of the present invention will be described in detail below with reference to the drawings. In diagrams, the same component elements are designated by the same reference numerals and their overlapped description is omitted here. Although each embodiment will be described by using a one-dimensional system for simplicity of explanation, a similar discussion can be also applied to a two-dimensional system.

As mentioned above, as for a parallax image, by executing processings such as extraction, rearrangement, combination, and the like of pixels, a refocus, control, of a depth of field, a change in viewpoint, and the like can be performed. In the following description, it is assumed that an image subjected to the refocus processing is called "refocus image". A combined image in this case may be subjected to a processing such as a noise reduction or the like and a reconstruction processing such as control of the depth of field or the like. It is assumed that a range in which the image can be refocused in an object space is called "focus control range".

First Embodiment

FIG. 1 is a diagram illustrating a construction of a main portion of an imaging apparatus according to the first embodiment of the invention.

In the diagram, a lens unit 10 of an interchangeable lens type and a camera main body 20 are connected through an electrical connection 30. An image formation optical system 101 forms an optical image of an object. The image formation optical system 101 is constructed by: a zoom lens group 101a constructed by a plurality of lenses for performing a magnification operation of the optical image; a focus lens group 101b constructed by a plurality of lenses for performing a focus adjustment; and an iris 101c. Each of the zoom lens group 101a and the focus lens group 101b is illustrated as a single lens for simplicity of explanation. An imaging unit 104 is constructed by a microlens array (hereinbelow, referred to as "MLA") 102; and a two-dimensional imaging element 103 having a photoelectric conversion unit such as CCD, CMOS, or the like. A parallax image obtaining unit 100 is constructed by the image formation optical system 101 and the imaging unit 104.

Figure 2:
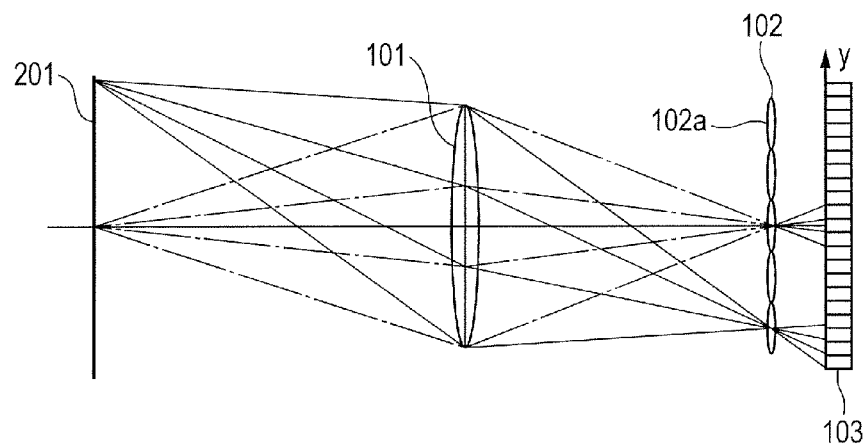
FIG. 2 is a diagram for describing an image pickup of a parallax image which is performed by a parallax image obtaining unit of the imaging apparatus in FIG. 1.

An image pickup construction of a parallax image by the parallax image obtaining unit 100 will now be described with reference to FIG. 2. The MLA 102 is arranged on an image-side conjugate plane for an object plane 201 of the image formation optical system 101. Further, the MIA 102 is constructed in such a manner that an exit pupil of the image formation optical system 101 and the imaging element 103 have an almost conjugate relation. A ray of light from the object plane 201 passes through the image formation optical system 101 and the MLA 102, so that it enters different pixels of the imaging element 103 in accordance with a position and an angle of the ray of light on the object plane 201. Thus, a light field is obtained. The MLA 102 has a function of preventing such a situation that the rays of light which passes through the different positions on the object plane 201 enter the same pixel. Consequently, in the imaging element 103, an image in which a group of pixels obtained by photographing the same area on the object plane 201 from a plurality of viewpoints are arranged is obtained.

Returning to FIG. 1, an operation unit 105 has therein an A/D converter, a white balance unit, a gamma correction unit, an interpolation operation unit, and the like and can generate an image for recording. The operation unit 105 can also include a development unit, an object recognition unit, a distance measurement unit, a calculation unit of a range of a lens position at which the image can be refocused, a calculation unit of an optimum position of the lens; lens position determination unit, and the like. Energy of the ray of light which passed through the image formation optical system 101 and the MLA 102 and entered the imaging element 103 is subjected as an image pickup signal to a development processing by the operation unit 105 and is output as a display image. The display image is output by a display unit 106 such as a liquid crystal display or the like. An operation detection unit 107 detects an operation such as a depression of a release key (not shown) or the like. A memory unit 108 stores in and outputs the stored information. A camera system control unit 109 controls the operation unit 105, display unit 106, operation detection unit 107, and memory unit 108. The camera system control unit 109 executes a program stored in a memory (not shown) and controls each unit. The camera system control unit 109 communicates with the lens unit 10 connected through the electrical connection 30, thereby controlling each unit of the lens unit 10.

In the lens unit 10, a lens system control unit 110 communicates with the camera main body 20 connected through the electrical connection 30, thereby controlling a lens drive unit 111. The lens drive unit 111 drives the zoom lens 101a, focus lens 101b, and iris 101c in accordance with control information from the camera.

Subsequently, the refocus processing will be described. The refocus is described in detail in "Fourier Slice Photography" (refer to Ren Ng, 2005 ACM Trans. Graph. 24, 735-744). Therefore, the refocus processing will be simply described hereinbelow with reference to FIG. 2 illustrating the parallax image obtaining unit 100. In FIG. 2, since a pupil of the image formation optical system is two-dimensionally divided into nine portions (one-dimensionally divided into three portions), images at nine viewpoints are obtained. It is assumed that the image corresponding to one divided portion of the pupil is called "single-view image". Since the nine single-view images mutually have a parallax, a relative positional relation of the objects on the image changes in dependence on object distances. If the single-view images are combined so that a certain object overlaps, the object locating at different object distances are deviated and combined. An optical image of the object locating at the different object distance will be blurred due to such a deviation. A blur at this time is determined by the pupils corresponding to the single-view images used for the combination. If all of the nine images are combined, a blur of the image photographed by the image formation optical system 101 can be reproduced. Since the object which is overlaid by the combination of the single-view images may be arbitrary, the image which is focused to an arbitrary object and is photographed by the image formation optical system 101 can be reproduced as a refocus image. Such a processing is focus control after the photographing, that is, a refocus principle.

Figure 3:
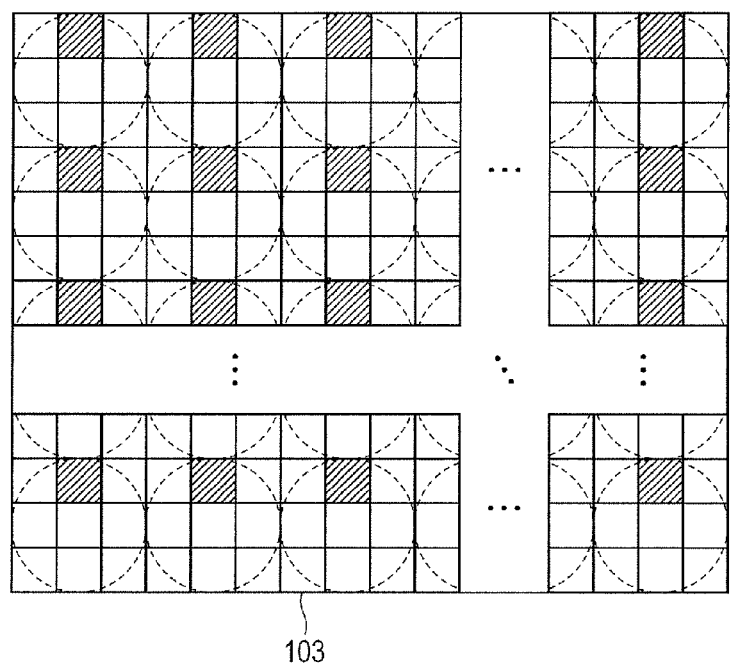
FIG. 3 is a diagram illustrating a relation between a microlens array and an imaging element in the parallax image obtaining unit in FIG. 2.

A generating method of the single-view images will, now be described. FIG. 3 is a diagram illustrating a relation between the MLA 102 and the imaging element 103 in FIG. 2. In FIG. 3, a circle of a broken line indicates an area of the pixel into which the ray of light which passes through one microlens 102a enters. Although FIG. 3 corresponds to a case where the microlenses 102a are arranged in a lattice pattern, a layout of the microlenses 102a is not limited to such a pattern. For example, they may be arranged in a layout having a six-fold symmetry or each microlens may be shifted finely from a regular layout.

A hatched portion in FIG. 3 indicates a pixel into which the ray of light which passes through the same pupil area of the image formation optical system 101 enters. By extracting a signal of the pixel shown by the hatched portion, the single-view image when viewing an object space from the same pupil area of the image formation optical system 101 can be generated. Similarly, other single-view images can be also generated by extracting the pixel signals in which the relative position to each circle shown by the broken line is identical.

Subsequently, a focus control range in which the image can be refocused and a range of the lens position at which the image can be refocused (hereinbelow, also referred to as a range of the refocus-possible bans position) will, be described. The focus control range is a range of an object distance of the object which can be refocused when the focus lens 101b exists at a certain position. The range of the lens position at which the image can be refocused is a range of the lens position at which the image can be refocused when the object is located at a certain object distance. Therefore, the range of a refocus-possible lens position (that is, the lens position at which the image can be refocused) is calculated every object. In the present embodiment, in order to obtain the range of the refocus-possible lens position, an equation to calculate the focus control range is derived and, from such an equation, an equation to calculate the range of the refocus-possible lens position is derived.

Figure 4A:
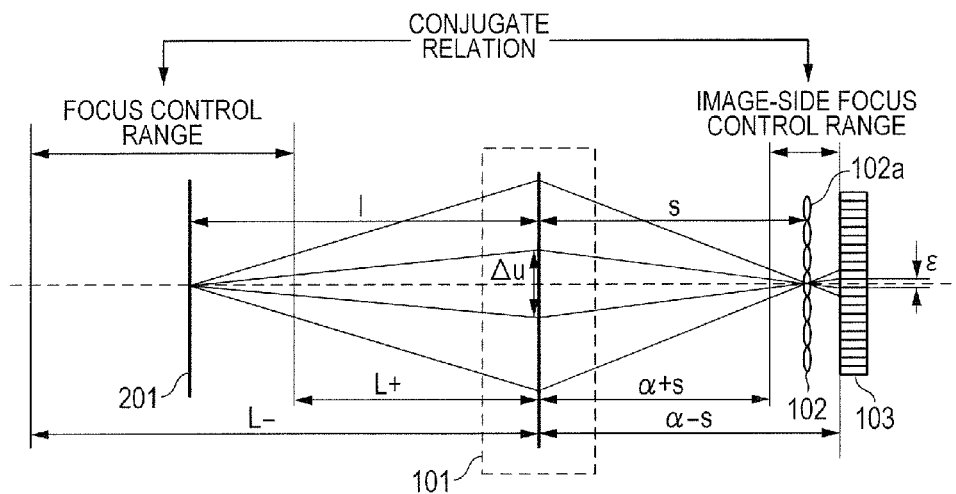
FIGS. 4A and 4B are diagrams each for describing a focus control range in the parallax image obtaining unit in FIG. 2.
Figure 4B:
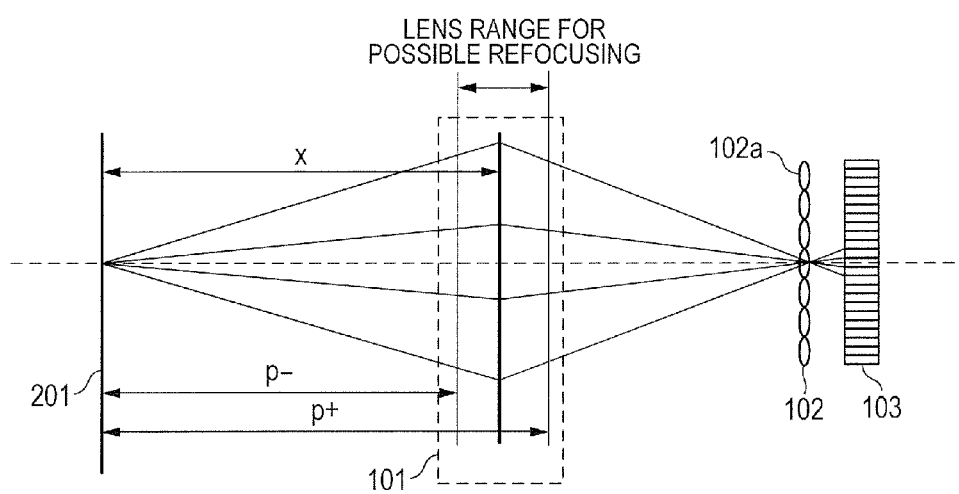

Subsequently, a method of calculating the range of the refocus-possible lens position will be described with reference to FIGS. 4A and 4B. FIGS. 4A and 4B are diagrams illustrating the parallax image obtaining unit 100. FIG. 4A is a diagram for describing the focus control range in the parallax image obtaining unit 100. FIG. 42 is a diagram for describing the range of the refocus-possible lens position in the parallax image obtaining unit 100. In the diagrams, s denotes an interval between an image-side principal plane of the image formation optical system 101 at the time when the focus lens 101b is positioned so that the object distance 1 is in focus, and an image-side conjugate plane of the image formation optical system 101 to the object plane 201, $\alpha$ denotes a refocus coefficient which is expressed by the following equation. An image side refocus range is $\alpha_+ s \sim \alpha_- s$. The image-side refocus range of $\alpha_+ s \sim \alpha_- s$ and the range which is conjugate to the image formation optical system 101 are the focus control range serving as an object-side refocus range. Assuming that a focal length of the image formation optical system 101 is set to f, the interval s is obtained by the following equation (1)

$$s = \frac{l \times f}{l - f} \quad (1)$$

The refocus coefficient $\alpha_\pm$ is obtained by the following equation (2).

$$\alpha_\pm = \frac{1}{1 \pm \varepsilon/\Delta u} \quad (2)$$

Where, $\varepsilon$ denotes a size of permissible circle of confusion of the depth of focus and $\Delta u$ denotes a sampling pitch of an angular component of the ray of light. Assuming that a pupil distance is set to $L_E$, a correspondence F value of the MLA 102 is set to $F_{no}$, and a pupil division number is set to N, $\Delta u$ is obtained by the following equation (3).

$$\Delta u = \frac{L_E}{F_{no} \times N} \quad (3)$$

Assuming that a focus control range is set to $L_+ \sim L_-$, $L_\pm$ can be obtained by the following equation (4) from an image formation formula $$L_\pm = \frac{1}{(1/f - 1/\alpha_\pm s)} \quad (4)$$

Consequently, a range $p_+ \sim p_-$ of the refocus-possible lens position when the object is located at a distance X can be obtained by solving the following equation (5).

$$p_\pm = \frac{1}{(1 - \alpha_\pm)/f + \alpha_\pm/X} \quad (5)$$

The operation which is executed by the operation unit 105 serving as a calculation unit for calculating the range of the refocus-possible lens position, that is, the operation for calculating the range of the refocus-possible lens position will be described in detail hereinafter.

Figure 5:
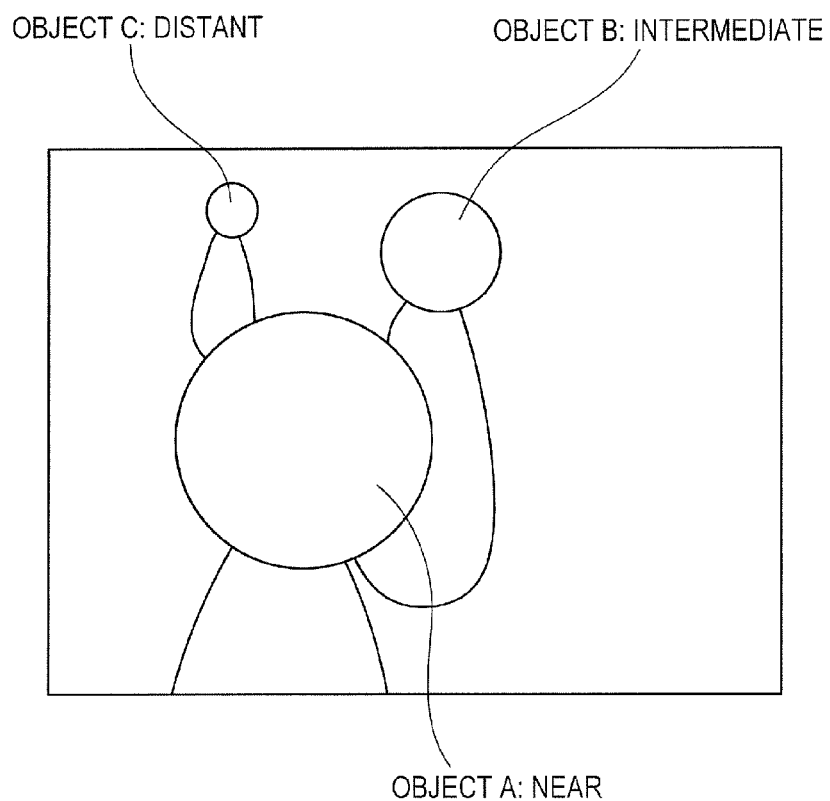
FIG. 5 is a diagram illustrating objects in an image angle in a photographed scene.
Figure 6:
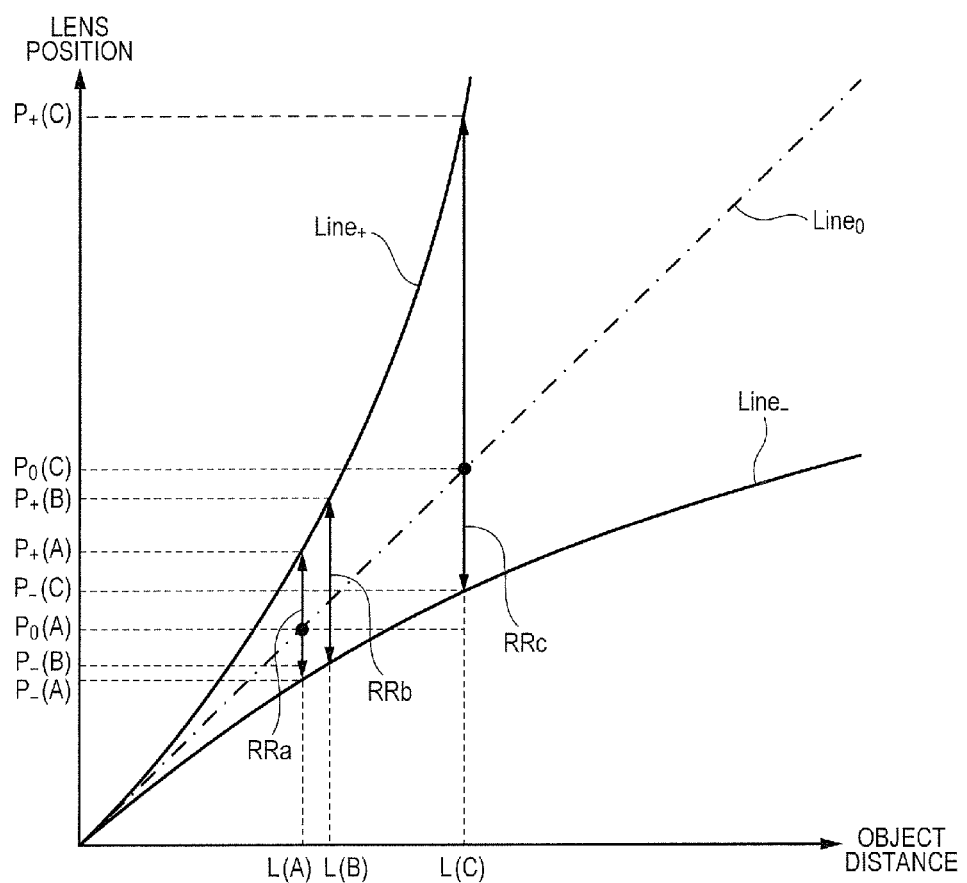
FIG. 6 is a diagram illustrating a relation between an object distance in the photographed scene in FIG. 5 and a range of a lens position at which an image can be refocused.

A calculating method of an optimum position of the focus lens 101b will be described with reference to FIGS. 5 and 6. FIG. 5 is a diagram illustrating objects in an image angle in a photographed scene. An object A exists at a distance near the imaging apparatus. An object C exists at a distant distance. An object B exists at an intermediate distance between them. FIG. 6 is a diagram illustrating a relation between the object distance and the range of the refocus-possible lens position. An axis of abscissa indicates the object distance. An axis of ordinate indicates the position of the focus lens 101b. The position of the focus lens 101b denotes an optical position corresponding to the object distance. For example, "the position of the focus lens 101b is equal to 1 m" denotes "the position of the focus lens 101b at which the object of object distance of 1 m is in focus". An alternate long and short dash line $Line_0$ is a straight line showing the lens position at which the object distance and the lens position are set to 1:1, that is, each object distance is in focus.

A solid line $Line_+$ and a solid line $Line_-$ indicate changes of an upper limit $P_+$ and a lower limit $P_-$ of the range of the refocus-possible lens position, to the object distance, respectively. L(A) to L(C) indicate object distances of the objects A to C. $P_-(A)$ to $P_-(C)$ indicate values on the line $Line_-$ at the object distances L(A) to L(C), respectively. $P_+(A)$ to $P_+(C)$ indicate values on the line $Line_+$ at the object distances L(A) to L(C), respectively. Each of arrows RRa, RRb, and RRc indicates a range of the refocus-possible lens position from each object.

As will be understood from FIG. 6, in the image photographed when the focus lens 101b exists at the position where the object A is in focus, that is, when the focus lens 101b exists at the position $P_0(A)$ illustrated in FIG. 6, it cannot be refocused to the object C. This is because $P_0(A)$ is out of the range RRc of the refocus possible lens position of the object C. On the other hand, in the image photographed when the focus lens 101b exists at the position where the object C is in focus, that is, when the focus lens 101b exists at the position $P_0(C)$ illustrated in FIG. 6, it cannot be refocused to the object A. This is because $P_0(C)$ is out of the range RRa of the refocus-possible lens position of the object A. Therefore, in order to obtain the image which can be refocused to all of the objects A to C, it is desirable that the focus lens 101b is located at the lens position included in all of the ranges shown by the arrows RRa, RRb, and RRc, that is, it is positioned in a range between $P_+(A)$ and $P_-(C)$. Thus, it is assumed that the optimum position of the focus lens 101b is an intermediate position between $P_+(A)$ and $P_-(C)$ as a predetermined position in consideration of an operation error and a mechanism accuracy error. The operation to calculate the lens optimum position by the operation unit 105 serving as a lens optimum position calculation unit will be described in detail hereinafter.

Figure 7:
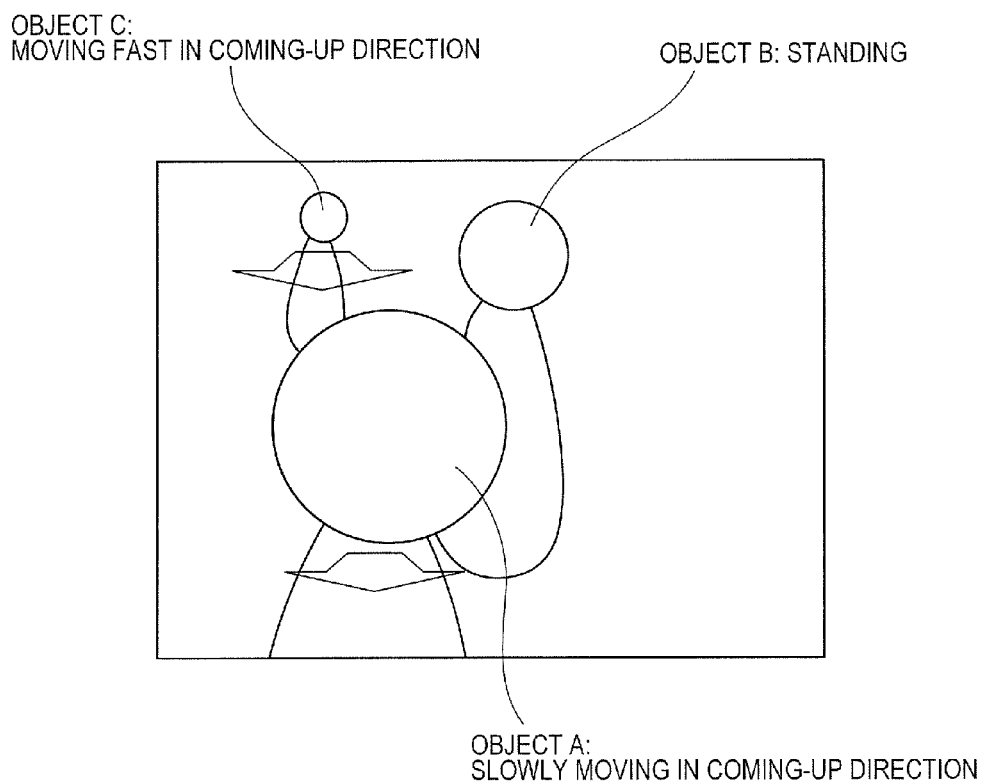
FIG. 7 is a diagram illustrating motions of objects in the photographed scene.

FIG. 7 is a diagram illustrating motions of the objects in the photographed scene illustrated in FIG. 5. Distant and near positions of the objects are substantially the same as those illustrated in FIG. 5. In the photographed scene illustrated in FIG. 7, the object A slowly moves in the coming-up direction toward the imaging apparatus, the object B is standing, and the object C moves fast in the coming-up direction toward the imaging apparatus.

Figure 8:
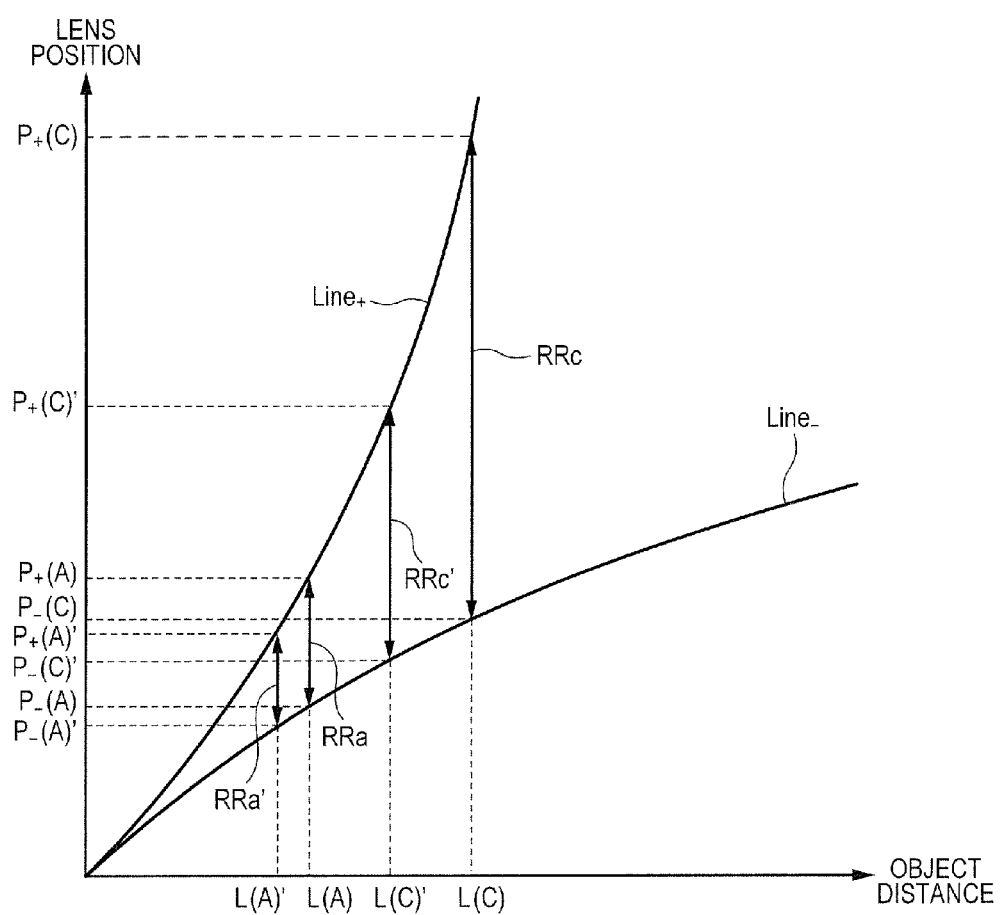
FIG. 8 is a diagram illustrating an object distance in the photographed scene in FIG. 7 and a change of the range of a lens position at which an image can be refocused.

FIG. 8 is a diagram illustrating a change of the range of the refocus-possible lens position to the object distance in the photographed scene illustrated in FIG. 7. Since it is sufficient to pay attention only to the object A existing at the position nearest to the imaging apparatus and the object C existing at the most distant position from the imaging apparatus among the objects existing in the image angle, the change of the range of the refocus possible lens position to the object distance is illustrated and will be described with respect to only each of the objects A and C.

In FIG. 8, it is assumed that a position of the object A at time t is set to L(A), a position of the object C at time t is set to L(C), a position of the object A at time t' after the elapse of a certain time from time t is set to L(A)', and a position of the object C at time t' is set to L(C)'. $P_-(A)$ and $P_-(C)$ indicate values on the line $Line_-$ at the object distances L(A) and L(C) at time t. $P_+(A)$ and $P_+(C)$ indicate values on the line $Line_+$ at the object distances L(A) and L(C) at time t. $P_-(A)'$ and $P_-(C)'$ indicate values on the line $Line_-$ at the object distances L(A)' and L(C)' at time t'. $P_+(A)'$ and $P_+(C)'$ indicate values on the line $Line_+$ at the object distances L(A)' and L(C)' at time t'. Each of the arrows RRa and RRc indicates the range of the refocus-possible lens position at time t. RRa indicates the range between $P_+(A)$ and $P_-(A)$ RRc indicates the range between $P_+(C)$ and $P_-(C)$. Each of arrows RRa' and RRc' indicates a range of the refocus-possible lens position at time t'. RRa' indicates the range between $P_+(A)'$ and $P_-(A)'$. RRc' indicates the range between $P_+(C)'$ and $P_-(C)'$.

As illustrated in FIG. 8, the position and a length of each of the ranges RRa and RRc of the refocus-possible lens position are changed as the object distance of each object decreases. Therefore, the optimum position of the focus lens 101b to obtain the image which can be refocused to the objects A and C changes from the intermediate position between $P_+(A)$ and $P_-(C)$ to the intermediate position between $P_+(A)'$ and $P_-(C)'$. In other words, it will be understood that if the objects are moving objects, the optimum position of the focus lens 101b changes.

Figure 9C:
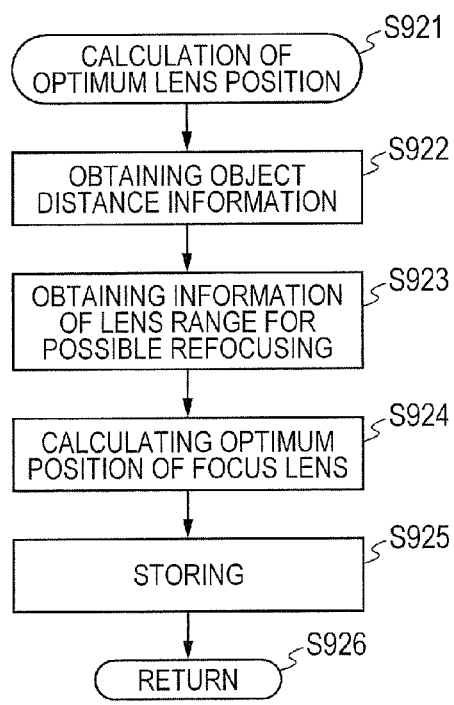
Figure 9D:
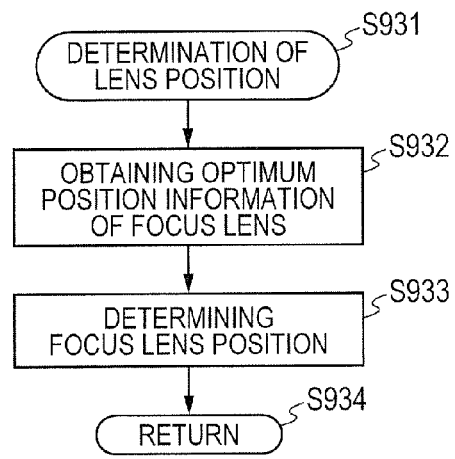

Subsequently, the photographing operation of the imaging apparatus according to the embodiment will be described. FIGS. 9A to 9D are diagrams illustrating flowcharts for the photographing operation of the imaging apparatus according to the embodiment. FIG. 9A is the diagram illustrating the flowchart for the whole photographing operation. FIG. 9B is the diagram illustrating the flowchart for the calculating operation of the range of the refocus-possible lens position. FIG. 9C is diagram illustrating the flowchart for the calculating operation of the optimum position of the focus lens. FIG. 9D is the diagram illustrating the flowchart for the determining operation of the lens position. The operations shown in those flowcharts are controlled by the camera system control unit 109.

In step S901, the operation detection unit 107 detects that the photographing is started. When the start of the photographing is detected, step S902 follows. In step S902, the imaging unit 104 obtains the image signal. The image signal is subjected to a processing such as an analog/digital conversion or the like by the operation unit 105. After completion of the image processing, step S903 follows. In step S903, the operation unit 105 serving as a calculation unit of the range of the refocus-possible lens position calculates the range of the refocus-possible lens position.

The calculating operation of the range of the refocus-possible lens position will be described with reference to FIG. 9B.

Step S911 indicates a start of the calculating operation of the range of the refocus-possible lens position. In step S912, the operation unit 105 recognizes the objects in the image. The recognition of the objects is performed by using a well-known technique. The objects mentioned here denote objects serving as targets to be refocused by the user and indicate objects such as a human body and the like other than the background. In the case where the user preliminarily designates objects to be refocused, the objects are recognized by the operation detection unit 107 in this step or may be preliminarily designated. After completion of the object recognition, step S913 follows.

In step S913, the operation unit 105 calculates distance information of each object recognized in step S912. The distance information is calculated from parallax information of a parallax image which is input. However, the distance information may be obtained by using a method such as DFD (Depth From Defocus) or the like or a measuring unit using an infrared ray or the like. The obtained object distance information is stored into the memory unit 108. After completion of the storage of the object distance information, step S914 follows.

In step S914, the range of the refocus-possible lens position with respect to each object is calculated by the foregoing calculating method on the basis of the object distance calculated by the operation unit 105 in step S913. After completion of the calculation of the range of the refocus-possible lens position, step S915 follows.

In step S915, the memory unit 108 stores the range of the refocus-possible lens position calculated in step S914. After completion of the storage, step S916 follows.

Step S916 indicates completion of the operation of the range of the refocus-possible lens position. After completion of the calculating operation, step S904 follows. In step S904, the optimum position of the focus lens 101b is calculated by the calculating operation of the lens optimum position. The calculating operation of the lens optimum position will now be described with reference to FIG. 9C.

Step S921 indicates the start of the operation of the calculation unit of the range of the refocus-possible lens position. In step S922, the operation unit 105 obtains the object distance information stored in the memory unit 108. The object which is most distant from the imaging apparatus and the object which is nearest thereto are recognized. After completion of the recognition, step S923 follows.

In step S923, the operation unit 105 obtains the information of the range of the refocus-possible lens position of each of the most distant object and the nearest object which are recognized in step S922 from the memory unit 108. After completion of the obtainment of the information of the ranges of the refocus-possible lens position, step S924 follows.

In step S924, the operation unit 105 calculates the optimum position of the focus lens 101b by the foregoing calculating method on the basis of the range of the refocus-possible lens position of each of the most distant object and the nearest object. After completion of the calculation of the optimum position of the focus lens 101b, step S925 follows.

In step S925, the memory unit stores the optimum position of the focus lens 101b calculated in step S924 together with information of time when the image is obtained. The reason why the optimum position of the lens is stored together with the time information is to form a history of the optimum position from a plurality of to predetermined number of times) optimum positions of the focus lens 101b corresponding to the motion of the object. After completion of the storage, step S926 follows.

Step S926 indicates the completion of the calculating operation of the lens optimum position. After completion of the operation, step S905 follows.

In step S905, the camera system control unit 109 confirms whether or not the release key is depressed by the user. If it is confirmed that the release key is depressed, step S906 follows. If it is not confirmed that the release key is depressed, step S909 follows.

Figure 10:
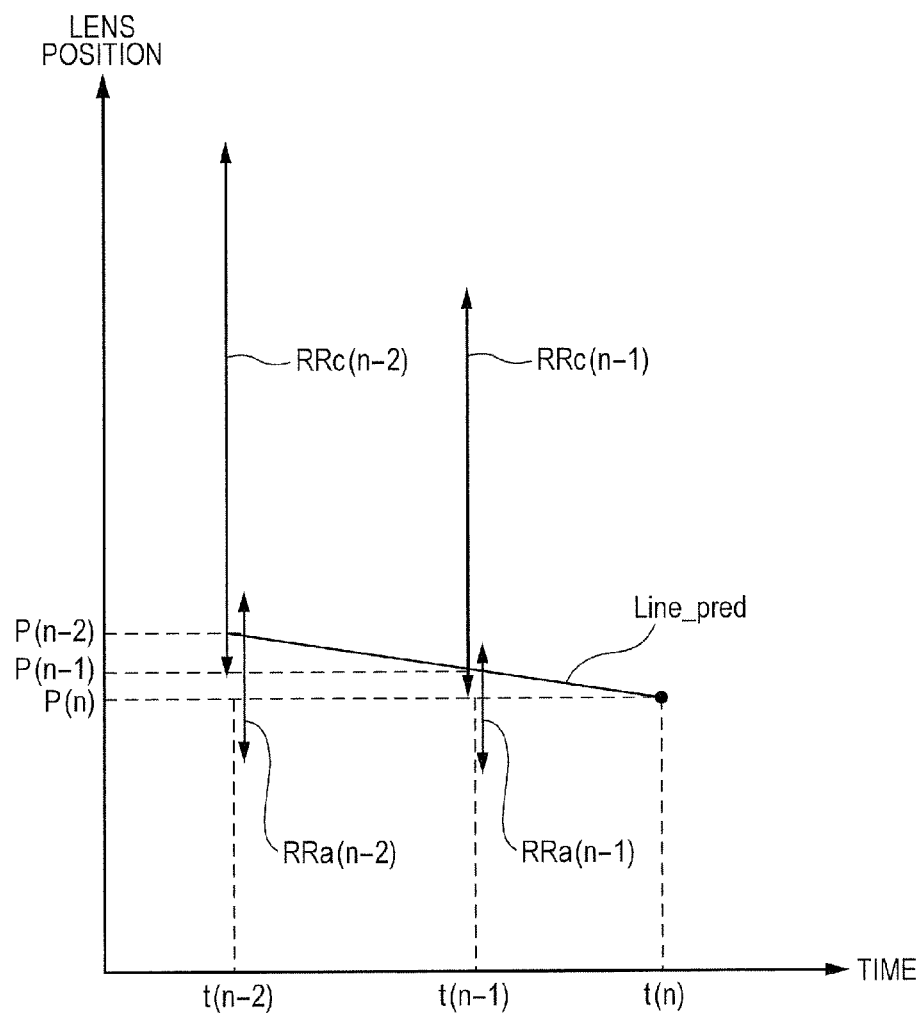
FIG. 10 is a diagram illustrating a lens position determining method in the imaging apparatus according to the first embodiment of the invention.

In step S906, the operation unit 105 serving as a lens position determination unit determines a drive position of the focus lens 101b at the time of photographing. The lens position determining operation will be described with reference to FIGS. 9D and 10. FIG. 10 illustrates a lens position determining method in the present embodiment. An axis of abscissa indicates a time and an axis of ordinate indicates the same position of the focus lens 101b as that of the axis of ordinate in FIG. 8. In FIG. 10, time t(n) indicates time which is predicted as time when the object is actually photographed after the lens optimum position is calculated. An optimum position P(n) of the focus lens at time t(n) is predicted in step S906. P(n−1) and P(n−2) indicate optimum positions of the focus lens 101b calculated in step S904 at time t(n−1) and t(n−2) in a period up to time when the depression of the release key is confirmed in step S905. Line_bred indicates a straight line passing through (t(n−1), P(n−1)) and (t(n−2), P(n−2)) and provides a prediction of the lens optimum position after t(n−1). Solid line arrows RRa(n−2), RRa(n−1), RRc(n−2), and RRc(n−1) indicate ranges of the refocus-possible lens position at time t(n−2) and t(n−1) of the objects A and C, respectively.

In FIG. 5D, step S931 indicates the start of the operation of the lens position determination unit. In step S932, the operation unit 105 obtains the focus lens optimum position information stored in the memory unit 108. After completion of the obtainment of the focus lens optimum position information, step S933 follows.

In step S933, the operation unit 105 determines the focus lens position. Line_pred is calculated from the history of the optimum position of the focus lens 101b obtained in step S932. Line_pred is calculated from the straight line passing through (t(n−1) P(n−1)) and (t(n−2) P(n−2)). A point P(n) on Line_pred at time t(n) is obtained and is determined as an optimum position of the focus lens 101b at the time of the actual photographing. After completion of the determination of the focus lens position, step S934 follows.

Step S934 indicates the completion of the operation of the lens position determination unit. After completion of the operation, step S907 follows.

In step S907, the camera system control unit 109 transmits the determined position information of the focus lens 101b obtained in step S906 to the lens system control unit 110. The lens system control unit 110 instructs the lens drive unit 111 to drive the focus lens 101b. The lens drive unit 111 drives the focus lens 101b to a determined drive position on the basis of a command from the lens system control, unit 110. After completion of the driving of the focus lens 101b, step S908 follows.

In step S908, the actual photographing operation is executed. The operation unit 105 properly processes the signal obtained by the parallax image obtaining unit 100 and stores into the memory unit 108 in a data format which makes refocus possible. After completion of the series of photographing operation, step S909 follows.

In step S909, whether or not the processing routine is finished is determined. When the operation detection unit 107 detects that the processing routine is finished, step S910 follows. If it is not detected that the processing routine is finished, the processing routine is returned to step S902 and a processing loop from step S902 to step S904 is repeated. In step S910, the photographing operation is completed.

According to the foregoing processing flow, since the object distance is not calculated for a period of time from the depression of the release key to the photographing operation, a release time lag cart be reduced.

In the present embodiment, in order to predict the optimum position of the focus lens 101b, a linear prediction from the latest two histories of the optimum position of the focus lens 101b is performed. However, the number of histories which are used to predict is set to three or more and a non-linear prediction may be performed.

By the above construction, the imaging apparatus which can obtain the image that can be refocused to the user's desired object while reducing the release time lag can be provided.

Second Embodiment

Subsequently, the second embodiment of the imaging apparatus to which the invention is applied will be described. Since a construction of a main portion of the imaging apparatus according to the present embodiment is similar to that in the first embodiment, its description is omitted here. It is assumed that a photographed scene is similar to that in the first embodiment.

Although the optimum position of the focus lens upon photographing is predicted in the first embodiment, a range of the refocus-possible lens position is predicted and the lens optimum position is determined from the predicted range in the second embodiment. Thus, after the release button is depressed, the arithmetic operation of the object distance or the like becomes unnecessary similarly to the first embodiment.

FIGS. 11A and 11B are diagrams illustrating a flowchart for the photographing operation of the imaging apparatus according to the present embodiment. Since the operations in steps S901 to S903 are substantially the same as those in the first embodiment, their description is omitted here.

In FIGS. 11A and 11B, in step S1104, the camera system control unit 109 confirms whether or not the release key is depressed by the user. If it is confirmed that the release key is depressed, step S1105 follows. If it is not confirmed that the release key is depressed, step S909 follows.

In step S1105, the operation unit 105 serving as lens position determination unit determines a lens position. The lens position determining operation will be described with reference to FIGS. 11B and 12.

Figure 12:
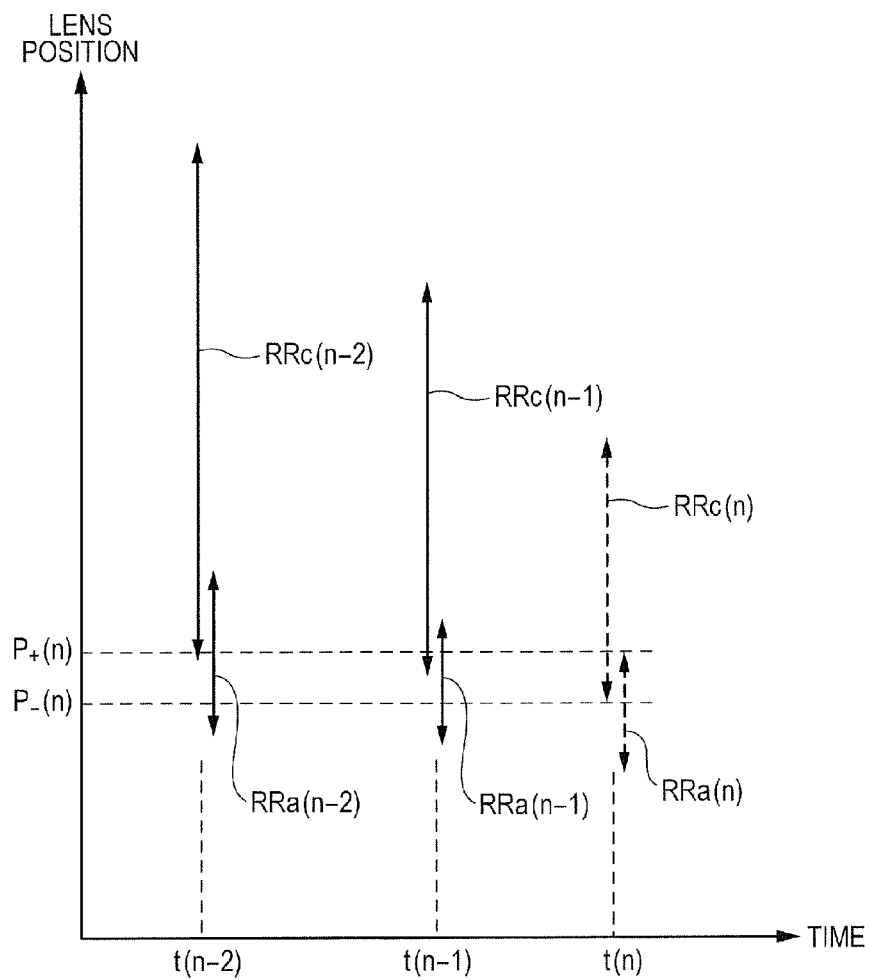
FIG. 12 is a diagram illustrating a lens position determining method in the imaging apparatus according to the second embodiment of the invention.

FIG. 12 illustrates a lens position determining method in the present embodiment. In the diagram, an axis of abscissa indicates a time and an axis of ordinate indicates the position of the focus lens 101b. In FIG. 12, time t(n) indicates time which is predicted as time when the object is actually photographed after the range of the lens position is calculated. In step S1105, the range of the refocus-possible lens position of each object at time t(n) as predicted. Solid line arrows RRa (n−2), RRa(n−1), RRb(n−2), RRb(n−1), RRc(n−2), and RRc(n−1) indicate ranges of the refocus-possible lens position of the objects A, B, and C which were calculated in step S903, respectively. Those ranges of the refocus-possible lens position are values calculated at time t(n−2) and t(n−1) in a period up to time when the depression of the release key is confirmed an step S1104.

In FIG. 11B, step S1111 indicates a start of the determining operation of the lens position. In step S1112, the operation unit 105 obtains the information of the range of the refocus-possible lens position of each object stored in the memory unit 108. After completion of the obtainment of the information of the ranges of the refocus-possible lens position, step S1113 follows.

In step S1113, the operation unit 105 determines the focus lens position. A range of the refocus-possible lens position of each object upon photographing is predicted from the history of the ranges of the refocus-possible lens position obtained in step S1112. In FIG. 12, the predicted ranges of the refocus-possible lens position of the objects at time t(n) are shown by RRa(n) and RRc(n). The optimum position of the focus lens 101b is determined from the predicted ranges RRa(n) and RRc(n) of the refocus-possible lens position of the objects upon photographing. It is sufficient, that the position of the focus lens 101b lies within a range where the ranges RRa(n) and RRc(n) of the refocus-possible lens position overlap, that is, a range from $P_+(n)$ to $P_-(n)$ in FIG. 12. The position of the focus lens 101b may be determined to an intermediate point between $P_+(ii)$ and $P_-(n)$ or to a position nearest to the current position of the focus lens 101b in the range from $P_+(n)$ to $P_-(n)$. After completion of the determination of the focus lens position, step S1114 follows.

Step S1114 indicates the completion of the determining operation of the lens position. After completion of the operation, step S907 follows.

The operations in steps S907 to S910 are substantially the same as those in the first embodiment and their description is omitted here.

According to the photographing operation of the embodiment mentioned above, since the object distance is not calculated, for a period of time from the depression of the release key to the photographing operation, the release time lag can be reduced. Therefore, even by the second embodiment, the imaging apparatus which can obtain the image that can be refocused to the user's desired object while reducing the release time lag can be provided.

Third Embodiment

Subsequently, the third embodiment of the invention will be described. Since a construction of a main portion of the imaging apparatus according to the present embodiment is similar to that in the first embodiment, its description is omitted here.

Figure 13:
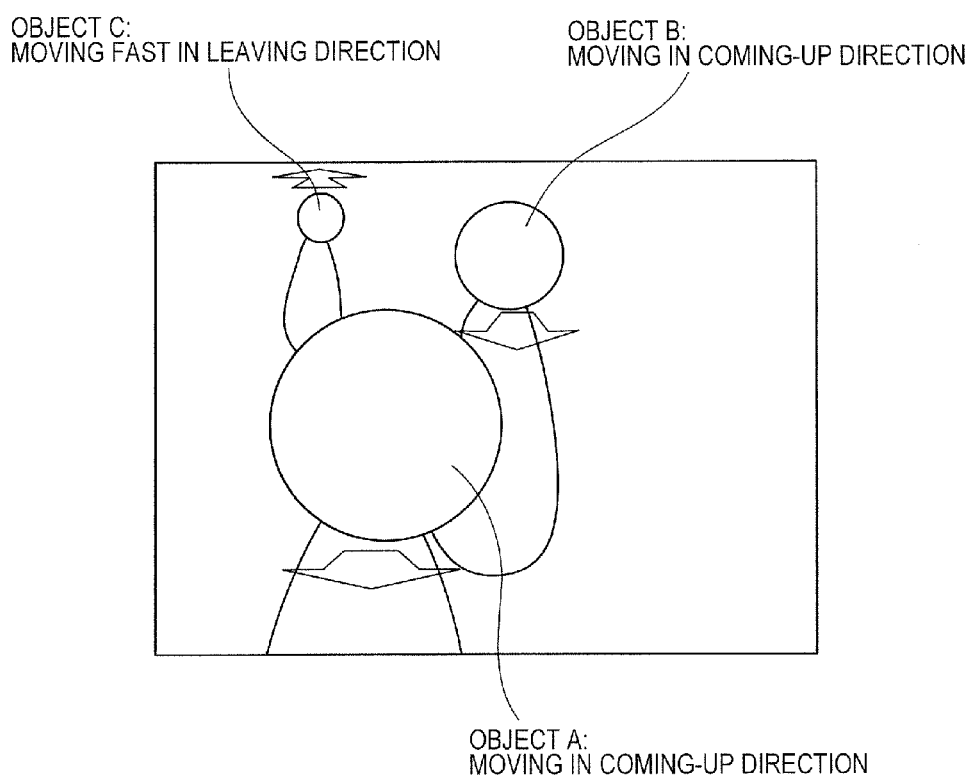
FIG. 13 is a diagram illustrating motions of objects in the photographed scene.

FIG. 13 is a diagram illustrating a photographed scene in the present embodiment. In the diagram, although a positional relation between the distant position and near position of objects in the image angle is substantially the same as the positional relation illustrated in FIG. 5, each object moves as follows. The objects A and B are moving in the coming-up direction toward the imaging apparatus. The object C is moving in the leaving direction from the imaging apparatus. That is, since all of the objects are moving in the present embodiment, the present embodiment is effective to the photographing of scenes in various situations as compared with the first or second embodiment showing a case where only the object nearest to the imaging apparatus and the object which is most distant therefrom are moving.

Figure 14A:
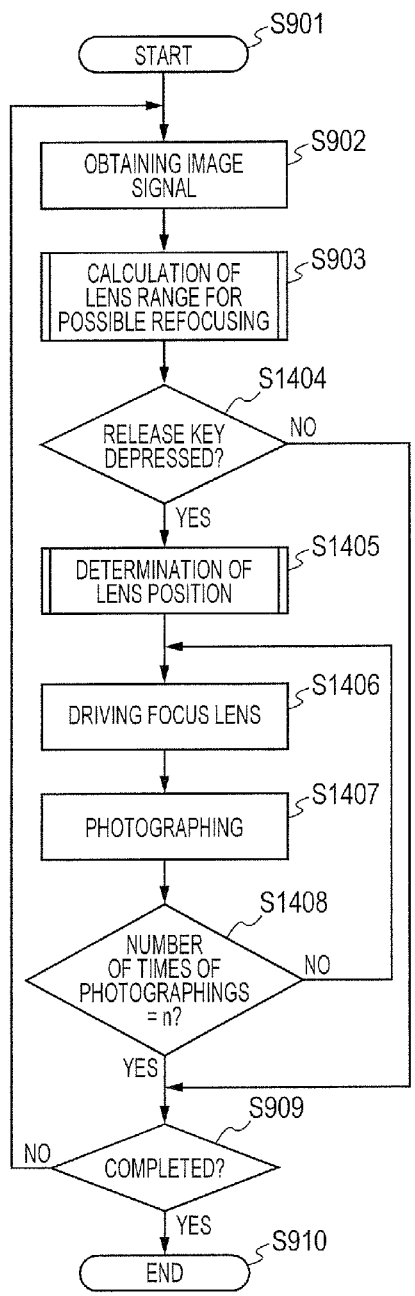
FIGS. 14A and 14B are diagrams illustrating a flowchart for the photographing operation of an imaging apparatus according to the third embodiment of the invention.
Figure 14B:
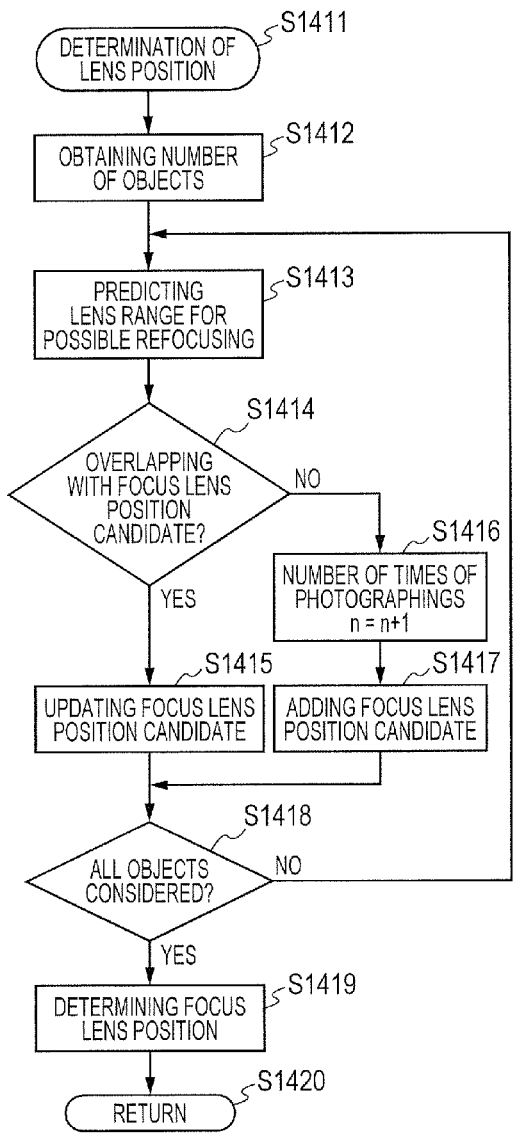

FIGS. 14A and 14B are diagrams illustrating a flowchart for the photographing operation of the imaging apparatus according to the present embodiment. FIG. 14A illustrates the flowchart for the whole photographing operation. FIG. 14B illustrates the flowchart for the calculating operation of the lens optimum position. In FIG. 14A, since the operations in steps S901 to S903 are substantially the same as those in the first embodiment, their description is omitted here.

In step S1404, the camera system control unit 109 confirms whether or not the release key is depressed by the user. If it is confirmed that the release key is depressed, step S1405 follows. If it is not confirmed that the release key is depressed, step S909 follows.

In step S1405, the operation unit 105 serving as a lens position determination unit determines a lens position. The lens position determining operation will be described with reference to FIGS. 14B and 15.

Figure 15:
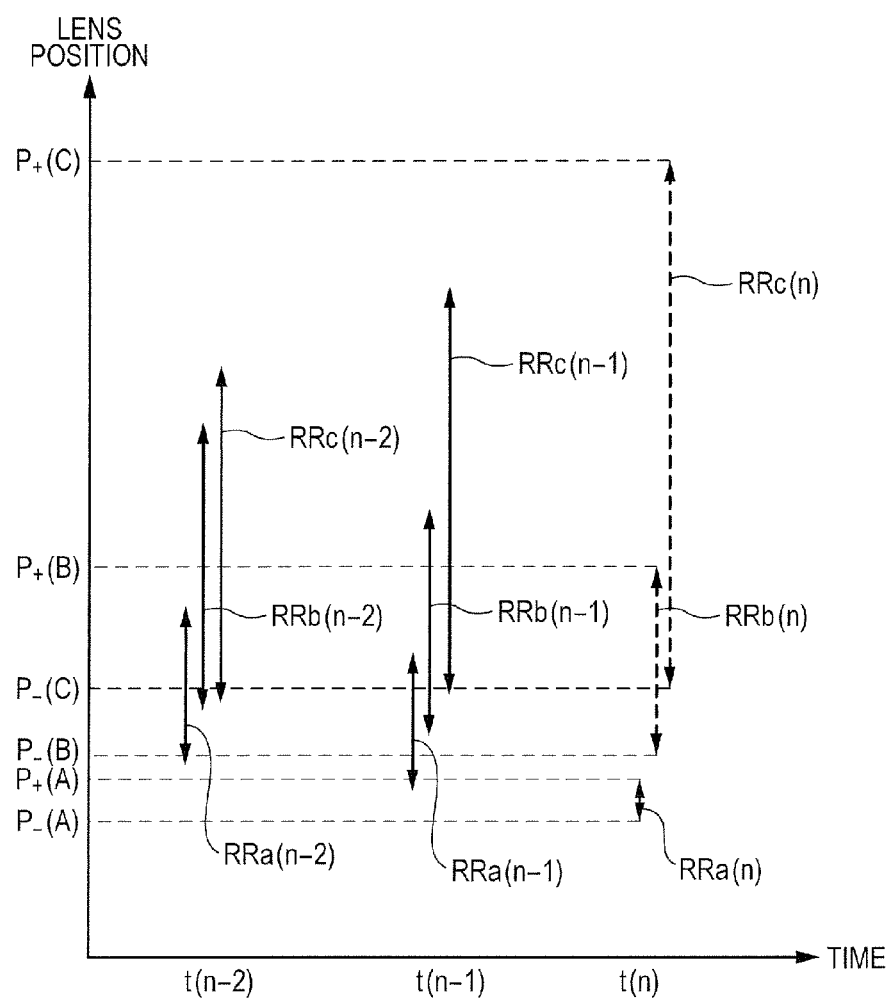
FIG. 15 is a diagram illustrating a lens position determining method in the imaging apparatus according to the third embodiment of the invention.

FIG. 15 illustrates a lens position determining method in the imaging apparatus according to the present embodiment. In the diagram, an axis of abscissa indicates a time and an axis of ordinate indicates the position of the focus lens 101b. Time t(n) indicates time which is predicted as time when the object is actually photographed. The solid line arrows RRa(n−2), RRa(n−1), RRb(n−2), RRb(n−1), RRc(n−2), and RRc(n−1) indicate the ranges of the refocus-possible lens position of the objects A, B, and C which were calculated in step S903, respectively. Those ranges of the refocus-possible lens position are ranges of the refocus-possible lens position which are calculated at time t(n−2) and t(n−1) in a period up to time when the depression of the release key is confirmed in step S1404.

In FIG. 14B, step S1411 indicates a start of the determining operation of the lens position. In step S1412, the operation unit 105 obtains the number of objects serving as refocusing targets stored in the memory unit 108. After completion of the obtainment of the number of objects, step S1413 follows.

The operations in steps S1413 to S1418 are operations for executing the processings in order from the object of the short object distance with respect to the objects serving as refocusing targets. The processing order of the objects is not limited to such order but priorities may be preliminarily set by the operation detection unit 107.

In step S1413, the operation unit 105 predicts a range of the refocus-possible lens position of the object of the shortest object distance among the objects in which the processing is not finished yet. After completion of the prediction of the range of the refocus-possible lens position, step S1414 follows.

In step S1414, the operation unit 105 confirms whether or not there is a range which overlaps with a candidate range of the focus lens position and the range of the refocus-possible lens position which is predicted in step S1413. If there is an overlapped range, step S1415 follows. If there are no overlapped ranges, step S1416 follows.

In step S1415, the memory unit 108 updates a candidate range of the focus lens position and stores. The candidate range of the focus lens position which is updated is an overlapped range of the candidate range of the focus lens position which is already stored and the obtained range of the refocus-possible lens position. After completion of the updating of the candidate range of the focus lens position, step S1418 follows. At this time, the camera system control unit 109 may control, for example, the display unit 106 in accordance with a discrimination result showing the absence of the overlapped range and may notify the user that it is necessary to newly photograph.

In step S1416, the number of times of photographing is updated. This is because if there is not the overlapped range of the candidate range of the focus lens position and the obtained range of the refocus-possible lens position in step S1414, the image data from which a refocus image of the corresponding object can be generated has to be obtained by photographing once more. After completion of the updating of the number of times of photographing, step S1417 follows.

In step S1417, the memory unit 108 adds a candidate range of the focus lens position and stores. The candidate range of the focus lens position which is added is the range of the refocus-possible lens position which is predicted in S1413. After completion of the addition of the candidate range of the focus lens position, step S1418 follows.

In step S1418, the camera system control unit 109 confirms whether or not the processings to all, objects are completed. If it is confirmed that the processings to all objects are completed, step S1419 follows. If the processings to all objects are not completed, the processing routine is returned to step S1413.

In step S1419, the operation unit 105 determines the focus lens position. When the number of times of photographing is equal to that of a plurality of times, if the object is a moving object, concurrency among photographings is desirable. For this purpose, it is desirable that the focus lens position is set to a position where a drive amount of the focus lens 101b during the photographing can be reduced as much as possible in order to shorten, a photographing interval. Therefore, in the candidate range existing on the side of the shortest object distance among the stored candidate ranges of the focus lens position, the focus lens position is determined to the side of the longest object distance. In the candidate range existing on the side of the longest object distance among the stored candidate ranges of the focus lens position, the focus lens position is determined to the side of the shortest object distance. As illustrated in FIG. 15, in the photographed scene in the present embodiment, the candidate ranges of the focus lens position of the focus lens 101b are two ranges of a range of $P_+(A) \sim P_-(A)$ and a range of $P_+(B) \sim P_-(C)$. Therefore, the position of the focus lens 101b upon photographing is determined to two positions of $P_+(A)$ and $P_-(C)$. When the position of the focus lens 101b is determined, step S1420 follows.

Step S1420 indicates the completion of the calculating operation of the lens optimum position. After completion of the operation, step S1406 follows. In step S1406, the operation unit 105 transmits the information of the determined position of the focus lens 101b obtained in step S1405 to the lens system control unit 110 in accordance with the number of times of photographing. In accordance with such information, the lens system control unit 110 instructs the lens drive unit 111 so as to drive the focus lens 101b. The lens drive unit 111 drives the focus lens 101b on the basis of the command from the lens system control unit 110. After completion of the driving of the focus lens 101b, step S1407 follows.

In step S1407, the actual photographing operation is executed. The operation unit 105 properly processes the electric signal obtained by the parallax image obtaining unit 100 and stores into the memory unit 108 in an image data format which makes refocus possible. The operation unit 105 executes a development processing so that the image can be displayed to the display unit 106 and, thereafter, the display unit 106 displays the obtained image. After completion of the series of photographing operation, step S1408 follows.

In step S1408, the camera system control unit 109 confirms whether or not the photographing is performed the necessary number of times which is calculated in step S1405. After completion of the photographing of the necessary number of times, step S909 follows. If the photographing of the necessary number of times is not completed yet, the processing routine is returned to step S1406.

In step S909, whether or not the processing is finished is discriminated. When the operation detection unit 107 detects that the processing is finished, step S910 follows. When it is not detected that the processing is finished, the processing routine is returned to step S902. In step S910, the processing flow is completed.

According to the photographing operation of the embodiment mentioned above, since the object distance is not calculated for a period of time from the depression of the release key to the photographing operation, the release time lag can be reduced. Therefore, also by the construction of the embodiment, the imaging apparatus which can obtain the image that can be refocused to the user's desired object while reducing the release time lag can be provided.

Other Embodiments

Embodiments of the present invention can also be realized by a computer of a system or apparatus that reads out and executes computer-executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer-executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-173763, filed Aug. 23, 2013, which is hereby incorporated by reference herein in its entirety.

What is claimed is:

1. An imaging apparatus including an image formation optical system having a lens for performing a focus adjustment of an optical image of an object, and an imaging unit configured to pick up the optical image formed by the image formation optical system and to generate a pixel signal from which a refocus image can be generated, the apparatus comprising:
    a calculation unit configured to obtain information of the object the optical image of which is picked up by the imaging unit and to calculate, on the basis of the obtained information of the object, a range of a position of the lens at which the refocus image of the object being in-focus can be generated;

a prediction unit configured to predict, on the basis of the range of the lens position, a change of the calculated lens position at which the refocus image of the object being in-focus can be generated; and a determination unit configured to determine a drive position of the lens on the basis of a result of the prediction.

2. An apparatus according to claim 1, wherein the calculation unit repetitively obtains the information of the object, calculates, on the basis of the obtained information of the object, the range of the lens position at which the refocus image of the object being in-focus can be generated, and forms a history of the range of the lens position, and wherein on the basis or the formed history of the range of the lens position, the prediction unit predicts the change of the calculated lens position at which the refocus image of the object can be generated.

3. An apparatus according to claim 2, wherein the calculation unit obtains information of a plurality of objects and forms a history of the range of the lens position at which the refocus image can be generated with respect to each object being in-focus, and wherein on the basis of the history of the range of the lens position calculated with respect to each object, the prediction unit predicts the change of the calculated lens position at which the refocus image of each object can be generated.

4. An apparatus according to claim 3, wherein on the basis of an overlapped range of the lens position ranges calculated with respect to the plurality of objects, the prediction unit calculates an optimum position of the lens at which the refocus image of the object being in-focus can be generated and predicts the change of the calculated optimum position on the basis of the determined drive position, and wherein the determination unit determines the predicted optimum position as the drive position of the lens.

5. An apparatus according to claim 3, wherein on the basis of the history of the range of the lens position, the prediction unit predicts a change of the calculated range of the position of the lens at which the refocus image of each object being in-focus can be generated, and wherein the determination unit determines a predetermined position included in an overlapped range among the range of the lens position predicted with respect to each object as the drive position of the lens.

6. An apparatus according to claim 5, further comprising a discrimination unit configured to determine whether or not the range of the lens position predicted with respect to each object overlaps, wherein if there is a range of the lens position which does not overlap with any one of the lens position ranges among the ranges of the lens position predicted with respect to the respective objects, the discrimination unit sets a photographing of the object for which the range of the lens position which does not overlap with any one of the lens position ranges is calculated, and wherein the determination unit determines the drive position of the lens with respect to the photographing of the objects for which the lens position ranges which overlap with each other are calculated among the lens position ranges predicted with respect to the respective objects and the photographing of the object in which the lens position range which does not overlap with any one of the lens position ranges is calculated.

7. An apparatus according to claim 6, wherein in a case where the discrimination unit sets a plurality of photographings, the determination unit determines the drive position of the lens in such a manner that to the overlapped range of the calculated ranges of the lens position and the lens position range which does not overlap with any one of the lens position ranges, a position distant from the imaging apparatus is determined as the drive position of the lens in the overlapped range of the lens position near the imaging apparatus or the lens position range which does not overlap with any one of the lens position ranges, and a position near the imaging apparatus is determined as the drive position of the lens in the overlapped range of the lens position distant from the imaging apparatus or the lens position range which does not overlap with any one of the lens position ranges.

8. An apparatus according to claim wherein in accordance with priorities which are preset to the plurality of objects, the discrimination unit determines whether or not the range of the lens position calculated with respect to each object overlaps.

9. An apparatus according to claim 6, further comprising a notification unit arranged to notify a result of the determination by the discrimination unit if the discrimination unit determines lens position range which does not overlap with any one of the lens position ranges.

10. An apparatus according to claim 1, wherein the information of the object is an object distance and the calculation unit calculates the object distance by using the pixel signal.

11. An apparatus according to claim 10, wherein in accordance with the object distances of the plurality of objects, the discrimination unit determines whether or not the range of the lens position calculated with respect to each object overlaps.

12. An apparatus according to claim 11, further comprising a control unit configured to control in such a manner that the lens is driven in accordance with the drive position determined by the determination unit and the optical image of the object which is focus-adjusted by the driven lens is picked up by the imaging unit.

13. A control method of an imaging apparatus including an image formation optical system having a lens for performing a focus adjustment of an optical image of an object, and an imaging unit configured to pick up the optical image formed by the image formation optical system and to generate a pixel signal from which a refocus image can be generated, the method comprising:

a calculation step of obtaining information of the object the optical image of which is picked up by the imaging unit and calculating, on the basis of the obtained information of the object, a range of a position of the lens at which the refocus image of the object being in-focus can be generated;

a prediction step of predicting, on the basis of the range of the lens position, a change of the calculated lens position at which the refocus image of the object being in-focus can be generated; and a determination step of determining a drive position of the lens on the basis of a result of the prediction.

14. A non-transitory computer-readable storage medium storing a program for causing a computer to execute the control method according to claim 13.

* * * * *